Aug. 11, 1925.

G. O. SQUIER

TREE TELEPHONY AND TELEGRAPHY

Filed Aug. 8, 1919  3 Sheets-Sheet 1

INVENTOR.
George O. Squier
BY Robert H. Young
ATTORNEYS.

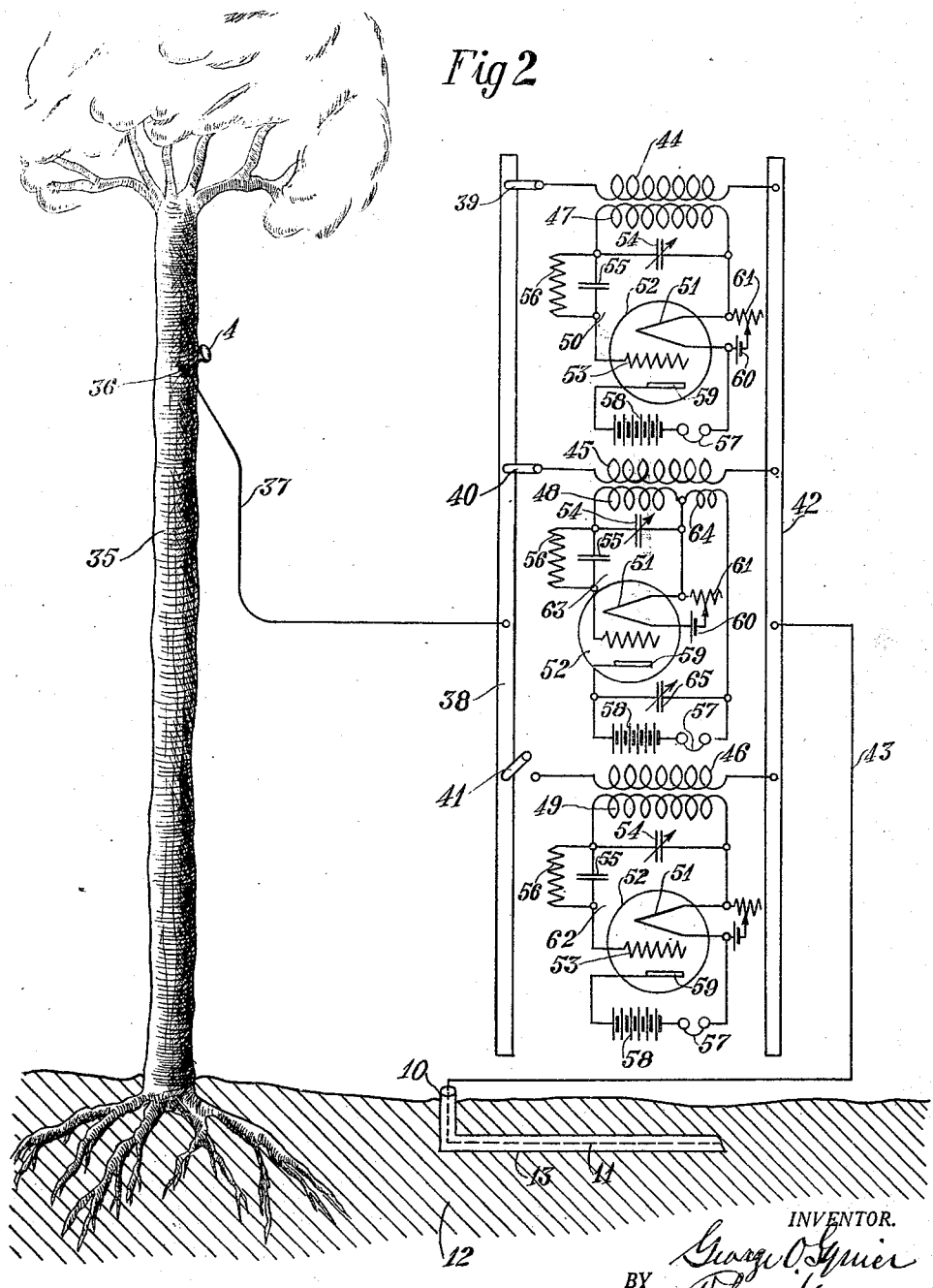

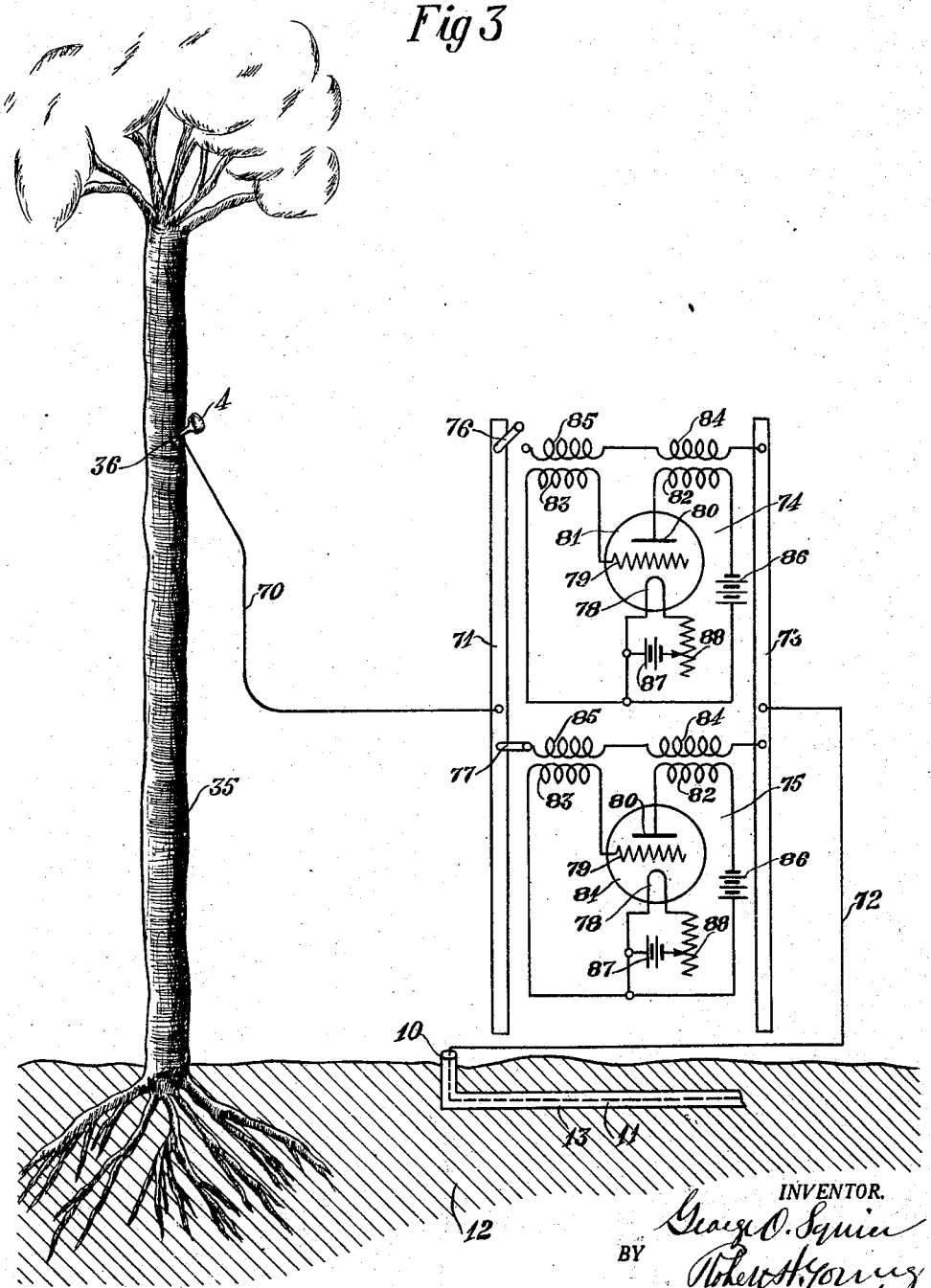

Patented Aug. 11, 1925.

1,549,032

UNITED STATES PATENT OFFICE.

GEORGE O. SQUIER, OF WASHINGTON, DISTRICT OF COLUMBIA.

TREE TELEPHONY AND TELEGRAPHY.

Application filed August 8, 1919. Serial No. 316,225.

*To all whom it may concern:*

Be it known that I, GEORGE O. SQUIER, a citizen of the United States, residing at Washington, District of Columbia, have invented certain new and useful Improvements in Tree Telephony and Telegraphy, of which the following is a specification.

This invention relates to radio communication.

More particularly, the invention relates to radio transmission and reception through the use of living vegetable organisms such as trees, plants and the like.

As disclosed in my U. S. Letters Patent No. 782,181, dated February 7, 1905, and corresponding foreign Letters Patent, British Patent 25,610 of 1904, I have discovered heretofore that tall trees and like growing vegetation possessed electrical conductivity of a certain nature adapted for the reception of signaling electro-magnetic waves and capable of forming a part of an antenna or aerial with the use of a direct earth "ground" or equivalent point of connection with the tree, in the potential node region.

I have recently discovered that living vegetable organisms generally are adapted for the transmission and reception of radio or high frequency oscillations, whether damped or undamped, with the use of a suitable counterpoise. I have further discovered that such living organisms are adapted for respectively transmitting or receiving a plurality of separate trains of radio or high frequency oscillations simultaneously, in the communication of either or both telephonic or telegraphic messages.

In such use of an antenna comprising living vegetable organism and a counterpoise, I have discovered that optimum results are obtained upon arranging the point of connection of the transmitting or the receiving set within a certain region of the tree, or other living vegetable organism; for trees indigenous in the temperate zones, I have discovered that such optimum point of connection is in a region approximately two-thirds of the height of the tree above the exposed surface of the earth.

In accordance with my invention for receiving radio trains of telephonic or telegraphic high frequency oscillations, a plurality of receiving sets attuned respectively to any desired definite frequency, may be connected by the same leading-in wire to the same tree, whereby such tree serves as the common receiving antenna for the respective individual receiving sets; and, similarly, for transmitting radio trains of telephonic or telegraphic high frequency oscillations, a plurality of transmitting sets respectively resonant to any desired frequency may be connected by a common lead-in wire to the same tree serving as the common antenna.

In the more preferred forms of my invention, I have devised suitable means for selective directional reception of radio oscillations of any desired definite frequency, by the use of coils in combination with a tree the windings of the coils disposed in substantial parallelism and mounted to be rotated in a horizontal plane, whereby electro-magnetic waves traveling in a direction parallel to the planes of the coils induce currents in the tree and the coils which action will neutralize each other's effects, while electro-magnetic waves traveling in a direction perpendicular to the planes of the coils induce currents only in the tree, thus producing an effect in the detector.

The counterpoise comprises preferably a suitable extent of conductor in the form of one or more lengths of wire disposed below the surface of the earth and suitably insulated therefrom; it is desirable to arrange a number of individual counterpoises, each extending rectilinearly in different directions to one another and to employ in directional selection the particular counterpoise extending substantially in the selected direction.

Further features and objects of the invention will be more fully understood from the following description and the accompanying drawings, in which—

Fig. 2 is a diagrammatic view of one preferred form of an arrangement of receiving sets, embodying my invention; and Fig. 3 is a diagrammatic view of a preferred form of an arrangement of transmission sets embodying my invention.

Figure 1:
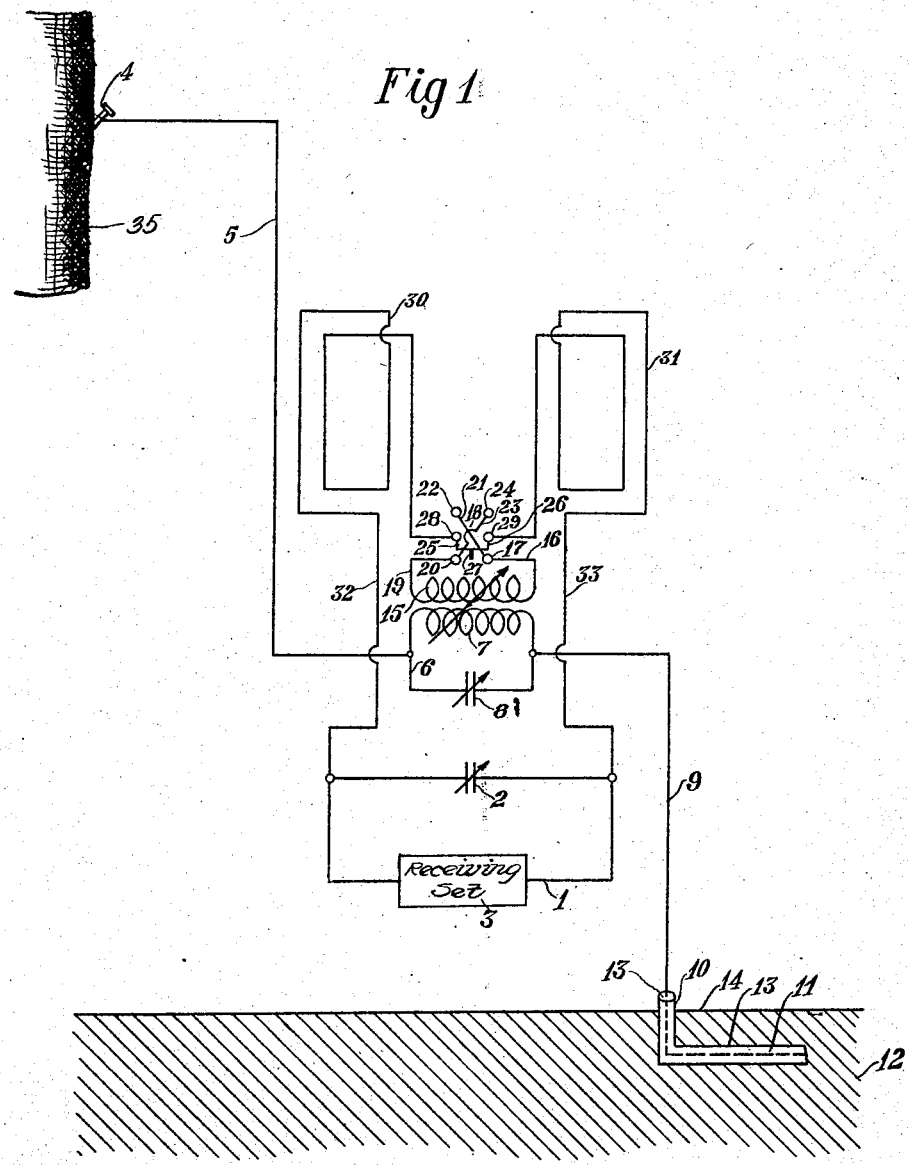
Fig. 1 is a diagrammatic vertical elevation of a preferred form of the invention.

Referring to Fig. 1, the circuit designated 1 represents any approved form of resonant receiving circuit comprising the variable condenser 2, and detector, rectifier or amplifier such as a three electrode vacuum tub 3, arranged with a telephone or any suitable recording device in the usual manner. Such attuned receiving circuit 1 is suitably coupled through transformer windings or otherwise with proper regulatable reactance with the tree or other living vegetable organism and in Fig. 1 I have indicated the point 4 as representing the location of a metallic nail, or equivalent, affixed to and extending within the body of such tree. I have discovered that optimum results for any particular tree is dependent upon the physical contour of the space occupied by the branches and leaves as well as the subterraneous portions of the tree such as the roots and that generally the optimum results are attained by affixing the nail 4 within the region of the tree substantially two-thirds of the height of the tree above the surface of the earth.

To such nail 4, is connected one end of the lead-in wire 5, preferably enclosed in suitable insulation, and connected at its other end with the resonant circuit 6 comprising the adjustable inductance coil 7 and the adjustable condenser 8. The lead 9 connects the circuit 6 with the counterpoise 10, preferably comprising one or more metallic wires 11 extending substantially rectilinearly and electrically insulated from the earth 12 by means of suitable insulation 13, as by enclosing such wire or wires 11 within a suitable insulating coating. Such coating 13 extends preferably an appreciable distance above the surface 14 of the earth 12.

In the use of my invention with living vegetable organism comprised in the antenna, I have arranged the counterpoise 10—13 extending in the rectilinear direction substantially parallel to the plane passing through the transmitting station, the receiving station and the center of the earth. It is advantageous to arrange a plurality of individual counterpoises 10 radiating in different rectilinear directions, with a suitable switching device for connecting the lead 9 with the particular counterpoise parallel to or most closely parallel to the selected direction.

Such coil 7 is preferably a primary coil suitably spacially coupled with an adjustable secondary coil 15 connected in the circuit comprising the variable condenser 2 and detector 3. In the specific form of the invention shown in Fig. 1, such secondary coil 15 is provided with the lead wire 16 connected to the terminal 17 of the reversing switch 18 (shown diagrammatically) the other end of the secondary coil 15 being connected by the wire 19 to the terminal 20 of the reversing switch 18. Such terminal 17 is connected by the cross wire 21 with the terminal 22 and the terminal 20 connected by the cross wire 23 with the terminal 24. The pivoted knife blades 25, 26, having the handle 27, are mounted in the usual manner on the central terminals 28, 29. The coil 30 represents diagrammatically a coil comprising a desired number of windings of successive turns of exposed or insulation covered wire, each turn lying substantially in a common vertical plane and the coil indicated at 31 represents a similar plurality of turns of windings mounted in substantially a common vertical plane. One terminal of the coil 30 is connected with one of the central terminals of the reversing switch 18, say terminal 28, and one terminal of the coil 31 is connected with the other central terminal 29, of the reversing switch 18. The other terminals of the coil 30 is connected by the wire 32 with the leads of the variable condenser 2 in shunt with the detector or amplifier 3, while the other terminal of the coil 31 is connected by the wire 33 to the opposite lead of the variable condenser 2 and the detector of amplifier 3.

Such set of coils 30, 31 are suitably mounted to be rotated horizontally, whereby all turns of the coils 30, 31, at any given position lie substantially in a common vertical plane. Such coils 30, 31, may be arranged on a common wooden or like insulating frame of cylindrical, rectangular or other desired contour in cross section.

By virtue of such arrangement the primary and secondary circuits are respectively directly exposed to and simultaneously electro-magnetically acted upon by the incoming oscillations, and by means of the reversing switch 18 the relations of the coils 30 and 31 to the circuit 6 may be reversed.

By means of such "barrage" effect, the oscillations of any given wave length directed in any definite absolute direction are cut out from the detector or amplifying circuit and enable oscillations of similar or the same wave length directed in a different direction to be conducted to the detector or amplifying circuit. By means of such accumulating effect of the coils 30, 31, and the switch 18, the waves of any definite wave length received in any definite absolute direction are amplified and enable long distance reception at any wave length.

In practice, I have carried out the invention for reception by the use of either a single receiving set or a plurality of receiving sets. Such receiving set or sets may be arranged either to receive damped high frequency oscillations or undamped high frequency oscillations.

In Fig. 2 I have illustrated diagrammatically one form of the application of the invention for the simultaneous reception of a plurality of different trains of high frequency oscillations.

The nail 4 is indicated as located in electrical connection with the tree 35 at an optimum point 36, the lead-in wire 37 being connected at its upper end with the nail 4 and at its lower end with the incoming connector bar 38. The connector 38 is provided with the individual switches 39—40—41, etc. corresponding to the number of individual receiving sets. The outgoing connector bar 42 is connected by the lead 43 with the counterpoise 10, preferably constructed and arranged as set forth hereinabove.

In suitable relation with the incoming connector bar 38 and outgoing connector bar 42 and the switches 39, 40, 41 are arranged the respective primary coils 44, 45, 46, etc. respectively coupled in any approved arrangement with the secondary coils 47, 48, 49.

The receiving set 50 is arranged for the reception of damped waves and is shown of the vacuum tube valve type. The terminals of the secondary 47 are suitably connected in the input circuit including the filament cathode 51 of the vacuum valve 52 and the grid 53 and comprises the variable condenser 54 in shunt with the secondary 47, the condenser 55 and the grid leak resistance 56. The output circuit comprises the battery 58, or equivalent, the anode plate 59, the filament cathode 51, and the telephone receiver or other audible, or any visual indicator 57. The heating circuit of the filament cathode includes the battery 60 and the variable resistance 61.

The receiving set 62 is shown of a similar damped oscillation receiving type and like elements are designated by like reference numbers.

The receiving set 63 is indicated of the undamped oscillation receiving type and comprises the additional inductance turns 64 having one terminal connected to one terminal of the filament cathode 51 and its other terminal connected to the variable condenser 65 in shunt to the telephone receiver 57 and the storage battery 58. The remaining elements of the receiving set 63 correspond to like elements of the receiving set 50 and are designated by like reference numbers.

In Fig. 2 I have shown the switch 39 in closed position with the primary inductance 44 of the receiving set 50, the switch 40 in closed position with the primary inductance 45 of the receiving set 63 and the switch 41 in open position with the primary inductance 46 of the receiving set 62, and accordingly enabling the reception and detection of damped oscillations of the frequency to which the receiving set 50 is tuned and simultaneously the reception and detection of undamped oscillations of the frequency to which the receiving set 63 is tuned.

Fig. 3 shows one form of practical application of my invention for transmitting simultaneously radio oscillations, either telephonic or telegraphic, either damped or undamped, or both. The nail 4, lodged at an optimum point 36 in the tree 35, is connected by the lead 70 to the connector bar 71, and the counterpoise 10 is connected by the lead 72 to the connector bar 73.

The transmitting sets 74, 75, etc. of the desired number, are suitably arranged for single or multiple transmission, for which purpose the switches 76, 77, etc. are provided. The transmitting sets 74, 75 are shown of any approved type, such as the oscillating vacuum tube type comprising the filament cathode 78, the grid 79 and anode 80, arranged in the vacuum tube 81, suitably connected with the primary inductances 82, 83, respectively coupled with the secondary inductance 84, 85. The primary inductances 84, 85 are suitably connected to the connector bar 73 and the connector bar 71 through the respective switches 76, 77. The battery or other source of electric current is indicated at 86. The adjustable heating circuit of the cathode filament 79 is shown comprising the battery 87 and the variable resistance 88.

In Fig. 3, the switch 77 is in closed position thus placing the transmitting set 75 in operative connection with the tree serving as the antenna. Upon closing the switch 76 the transmitting set 74 is similarly placed in operative connection with the tree antenna 35. Upon closure of both switches 76, 77 the tree serves as the antenna for the transmission of simultaneous trains of oscillations emitted by the respective transmitting sets 74, 75, modified by a key or telephone transmitter, or other suitable modulator, for the transmission of telegraphic or telephonic messages as desired.

In the use of trees or other living vegetable organism serving as the antenna or a part thereof, I have discovered from tests that such tree possesses impedance consisting of two components, resistance and reactance, the latter being usually condensive, for oscillations within the range of present day wave lengths. The tests also show that the apparent capacity of the tree serving as an antenna is substantially proportional to the height of contact of the lead wire connecting the transmission set with the tree.

The tests show that the apparent resistance of a tree serving as an antenna is appreciably greater than the resistance of the ordinary metallic antenna, and it is accordingly desirable to modify the resistance or alter the design of receivers, if it is desired to increase the effectiveness of the energy of the electro-magnetic radiation impinging on the tree; however, the ordinary receivers of present design may be used and are responsive to any wave length of radiation employed in present day practice.

Whereas I have described my invention by reference to specific forms thereof, it will be understood that many changes and modifications may be made without departing from the spirit of the invention as defined by the appended claims.

I claim:

1. The combination with living vegetable organism, of an electrical conducting element located at a suitable point on said organism above the exposed earth, a counterpoise, a plurality of radio transmission sets and common means connecting said transmission sets with said electrical conducting element.

2. The combination with living vegetable organism, of an electrical connecting element located at a suitable point on said organism above the exposed earth, a counterpoise, a plurality of radio transmission sets and common means connecting said transmission sets with said electrical conducting element and with said counterpoise.

In testimony whereof I affix my signature.

GEORGE O. SQUIER.